United States Patent [19]

Kasanuki

[11] Patent Number: 4,917,959
[45] Date of Patent: Apr. 17, 1990

[54] METHOD FOR PREPARING MAGNETIC RECORDING MEDIUM

[75] Inventor: Yuji Kasanuki, Machida, Japan

[73] Assignee: Canon Kabushiki Kaisha, Tokyo, Japan

[21] Appl. No.: 321,396

[22] Filed: Mar. 10, 1989

[30] Foreign Application Priority Data

Mar. 16, 1988 [JP] Japan .................................. 63-60322

[51] Int. Cl.$^4$ ......................... B32B 15/08; B05D 5/12
[52] U.S. Cl. .................................... 428/458; 427/128; 427/129; 427/131; 427/132; 428/337; 428/473.5; 428/694; 428/900
[58] Field of Search ................................. 427/128–129, 427/131–132; 428/694, 900, 337, 473.5, 458

*Primary Examiner*—Bernard Pianalto
*Attorney, Agent, or Firm*—Fitzpatrick, Cella, Harper & Scinto

[57] ABSTRACT

A method for preparing a magnetic recording medium, which comprises applying a thermal treatment at a temperature of 100° C. or higher on a polymeric substrate comprising a polybiphenyl type imide having a molecular structure shown below, and then forming a magnetic layer on said substrate, and magnetic recording medium prepared by said method.

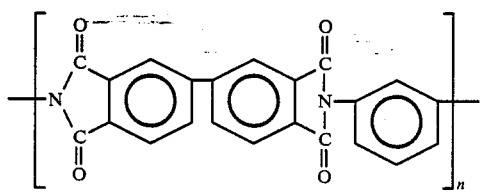

6 Claims, 1 Drawing Sheet $K_P = \frac{1}{2}(h_1 + h_2)$

METHOD FOR PREPARING MAGNETIC RECORDING MEDIUM

BACKGROUND OF THE INVENTION

1. Field of the Invention

This invention relates to a method for preparing a flexible magnetic recording medium.

2. Related Background Art

Pursuit of higher densification in magnetic recording has brought about high coercive force, thinner film of magnetic layer, etc. in magnetic recording medium. However, vertical magnetic recording has been proposed as the result of a pursuit of higher densification according to the method different from this, and practical applications have been progressed in various fields. The constitution of a vertical magnetic recording medium having the electromagnetic converting characteristics most approximate to practical application known in the art is so called flexible magnetic disc, comprising a magnetic layer of CoCr alloy thin film formed on a flexible polymeric substrate.

Such constitution had the drawback which was essentially inevitable during formation of the magnetic layer that the medium is subject to curved deformation, namely generation of curl, due to internal stress of thin film. When curl is generated, no good contact can be obtained between the magnetic head and the medium, thereby inconveniences occur such as lowering in reproduction output, lowering in S/N ratio or instability in running, etc. In realizing practical application, prevention of curl is extremely important.

One of the methods practiced in the prior art for prevention of curl of flexible magnetic disc is formation of magnetic layers on both surfaces, and another method is formation of a magnetic layer only on one surface to utilize heat shrinkage of the substrate, or provision of a coated layer on the back surface to cancel curl, but formation of magnetic layers on both surfaces is more suitable for practical application in view of simplicity of the steps.

As practical preparation steps, as shown schematically in FIG. 1, there has been generally known the method in which magnetic layers are formed on the polymeric substrate by continuous sputtering or continuous vapor deposition while a lengthy polymeric substrate 4 is moved continuously. Also, there has been used the system in which the substrate is moved as flat without use of the rotatory drum as shown in FIG. 2. Here, the rotatory drum 3 or the substrate holder 7 is adapted to be elevatable to desired temperature when forming a magnetic layer on the polymeric substrate for improvement of the magnetic characteristics of the CoCr magnetic layer. As the polymeric substrate, polyethyleneterephthalate, polyimide, polyamide, etc. have been known as representative ones.

However, according to such method of the prior art in which magnetic layers are formed on both surfaces of the polymeric substrates by use of polyethyleneterephthalate, polyimide, polyamide, etc., and the magnetic characteristics are improved by heating treatment during formation, the medium obtained suffered from curls generated irregularly in the longer direction of the medium, namely including the portion where curls can be removed and the portion where curls are generated, whereby curls cannot be removed stably. For this reason, there has been the problem that the production yield is low.

On the other side, a thermal treatment of a substrate before formation of a magnetic layer is proposed, for example, in Japanese Patent Laid-Open Application Nos. 69-139139, 60-121532, 60-129931, 60-133540 and 60-191434. However, conditions in a thermal treatment a polyimide substrate are not well known.

The use of polyimide as a substrate of a magnetic recording medium is described, for example, in Japanese Patent Laid-Open Application Nos. 60-138722 and 62-215631.

SUMMARY OF THE INVENTION

An object of the present invention is to provide a method for preparing a flexible magnetic recording medium with little generation of curl by improving the polymeric substrate as described above.

The present invention prepares a flexible magnetic recording medium by use of a polybiphenyl type imide having the molecular structure shown below as the polymeric substrate, and by carrying out the thermal treatment of said substrate at a temperature of 100° C. or higher before forming a magnetic layer on said substrate:

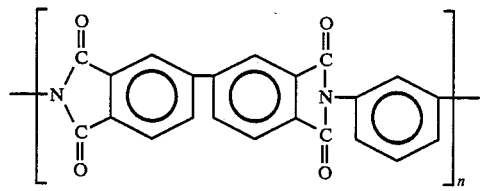

DETAILED DESCRIPTION OF THE INVENTION

The magnetic recording medium of the present invention comprises a magnetic layer formed on a polybiphenyl type imide polymeric substrate. The polybiphenyl type imide to be used in the present invention has a molecular structure of the formula shown below:

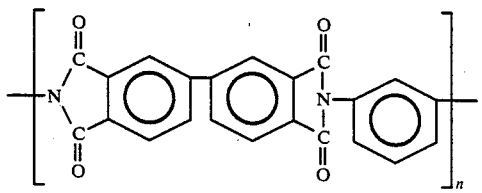

The polybiphenyl type imide is formed by condensation of p-phenylenediamine (PPD) and biphenyltetracarboxylic dianhydride (BPDA), excellent in heat resistance, dimensional stability and surface characteristic, and its thermally stable properties are particularly effective in a flexible magnetic recording medium of which substrate is heated during formation of magnetic film. More specifically, the above polybiphenyl type imide substrate has no glass transition point even when elevated in temperature, but it will be only decomposed gradually at 500° C. or higher, and has a small thermal expansion ratio of $3 \times 10^{-5}$ to $1 \times 10^{-6}$ cm/cm/°C., with a high Young's modulus of 800 to 1200 kg/mm², as preferable for a thin substrate. The average value of the polymerization degree is 500,000 or more.

Generally speaking, physical properties of polymeric substrates are liable to have hysteresis to heating, and for this reason, strain is generated on the substrate by the thermal treatment during formation of magnetic layer to cause generation of curl. Accordingly, for removing curl, in addition to having thermally stable properties, the extent of hysteresis is also an important factor.

Figure 3:
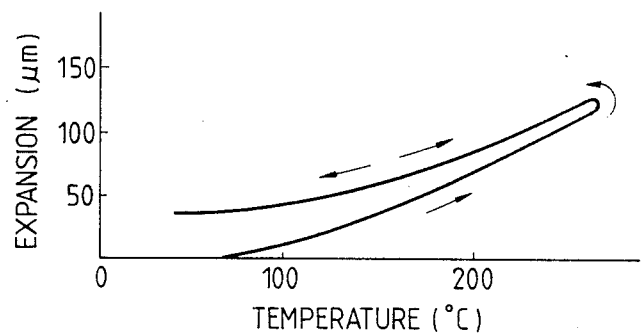
FIG. 3 is a graph showing an example of the measurement result of the hysteresis of substrate by TMA (thermomechanical analysis instrument)

In this respect, the polybiphenyl type imide of the above molecular structure, as different from polyethyleneterephthalate, polyimide, polyamide of the prior art, can exclude its hysteresis by carrying out heat treatment. FIG. 3 is the result of measurement of the stretching of the polybiphenyl type imide when the cycle of heating-cooling was repeated by TMA (thermomechanical analysis instrument). The present inventors prepared flexible discs by varying the thermal treatment temperature, and examined about generation of curl, and consequently found that generation of hysteresis can be inhibited by heat treatment at 100° C. or higher to remove stably curl.

On the other hand, also for not deteriorating the magnetic characteristics of the magnetic layer, it is desirable to subject the polybiphenyl type imide of the above molecular structure at 100° C. or higher. For example, the polybiphenyl imide generates gases such as $H_2O$, etc. when used in vacuum, and if no thermal treatment of the substrate is effected before formation of the magnetic layer, gases will be generated from the substrate by heating during formation of the magnetic layer, thereby deteriorating the magnetic characteristics of the magnetic layer. For this reason, it is preferable to subject said substrate to thermal treatment before formation of the magnetic layer, thereby liberating as much gases as possible. The amount of the gases generated from the above polybiphenyl type imide is abruptly increased at 100° C. or higher in vacuum, and therefore it is desirable to subject the substrate to thermal treatment at 100° C. or higher before formation of the magnetic layer also for the purpose of preventing deterioration of the magnetic characteristics of the magnetic layer.

Figure 1:
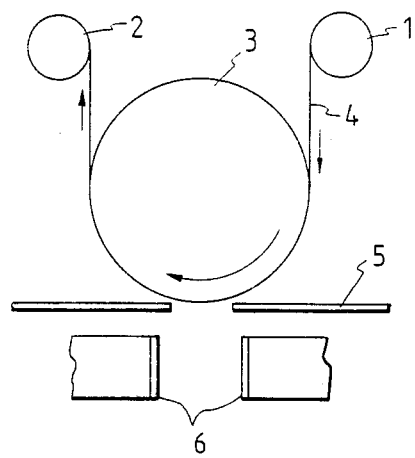
FIG. 1 is a front view showing the confronted target system sputtering device which conveys substrate by a rotatory drum.
Figure 2:
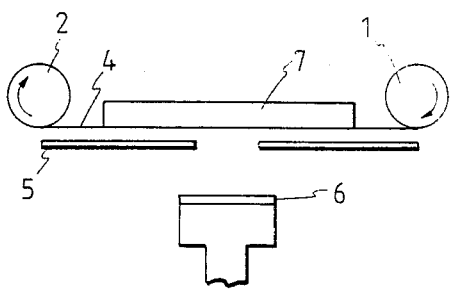
FIG. 2 is a front view showing an example of the sputtering device which conveys substrate by a flat substrate holder.

As the method for thermal treatment, for example, by use of a preparation device of magnetic recording medium known in the art as shown in FIG. 1 or FIG. 2, the rotatory drum 3 or the substrate holder 7 is heated to 100° C. or higher without formation of the magnetic layer, and the above polybiphenyl type imide is conveyed along the rotatory drum 3 or the substrate holder 7 to effect thermal treatment. The rotatory drum 3 or the substrate holder 7 are in themselves adapted to be elevated to desired temperatures for improvement of the magnetic characteristics of the magnetic layer, and therefore no special heating device is required. Otherwise, for example, the method of heating by an IR ray heater can be also used for carrying out thermal treatment of the above polybiphenyl type imide substrate. Also, the thermal treatment may be carried out either in air or in vacuum. The thermal treatment time can be suitably determined depending on the film thickness of the substrate, but may be appropriately from 5 minutes to 25 minutes, further appropriately 6 minutes to 20 minutes. The substrate should have a thickness preferably in the range of 10 to 100 μm. Further, the thermal treatment can be suitably conducted at the temperature of 300° C. or lower, further 250° C. or lower.

After the above thermal treatment, the preparation steps may be performed according to the methods known in the art. More specifically, subsequent to the heating treatment of the substrate, a magnetic layer is formed by a sputtering device or the vacuum vapor deposition method, and heat is applied for improvement of magnetic characteristics to form a magnetic recording medium. Since the substrate has been already subjected to thermal treatment at 100° C. or higher, substantially no hysteresis phenomenon will occur by heating during formation of the magnetic layer. The magnetic layer is formed on one surface or both surfaces of the substrate, but it is preferable to form magnetic layers on both surfaces, because curl can be generated with further difficulty. The thickness of the magntic layer, in both cases of forming it on one surface and both surfaces of the substrate, may be preferably about 0.4 μm.

As the ferromagnetic material for forming the magnetic layer, Co-Cr is preferred, but either a material which forms a magnetic layer for vertical magnetic recording to be magnetized in the direction perpendicular to the substrate surface, or a magnetic material for interplanar magnetic recording to be magnetized in the interplanar direction of the substrate may be available. For example, there can be included magnetic materials comprising ferromagneic metals or alloys composed mainly of Fi, Co, Ni such as Co, Co Ni, Co-Ni-P, Fe-Co, Fe-Cr, Co-V, Co-Rh, etc., or oxides, nitrides such as Co-O, Fe N, etc. The formulation ratio of Co-Cr can be also suitably selected.

Also, the magnetic layer, in addition to the embodiment in which it is directly formed on the substrate, may be provided through a high permeability film as represented by a non magnetic film such as of Al, Ti, Cr, Ge, $SiO_2$, $Al_2O_3$, etc., or amorphous film such as Fe-Ni alloy film, Co-Zr, Fe-P-C, Fe-Mn-Bi, Fe-Co-Si-B, etc.

Further, if necessary, a protective layer or a lubricating layer may be formed on the magnetic layer, or a back coat may be formed on the substrate surface opposite to the magnetic layer.

By punching out the magnetic recording medium having a magnetic layer formed on one surface or both surfaces into disc shapes, flexible magnetic discs free from curl generation can be obtained.

EXAMPLE 1

By means a confronted target system sputtering device as shown in FIG. 1, heat treatment and formation of a magnetic layer were performed. The polymeric substrate 4 consisted of a polybiphenyl type imide of the formula:

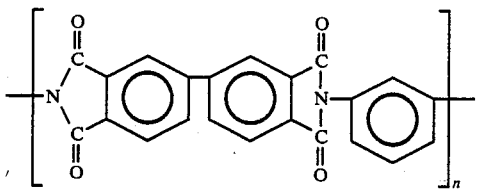

(n has an average value of 500,000 or more), having a thickness of 25 μm and a width of 80 mm. After the substrate was set in said sputtering device, the device was evacuated to vacuum and the rotatory drum 3 (diameter 300 mm) was elevated in temperature. The thermal treatment was carried out at a reached pressure of $2 \times 10^{-3}$ Pa or less at the respective temperatures of 100° C. and 190° C. The tension of the polymeric substrate 4 was 1.2 kg, and its conveying speed was 6 cm/min.

After the thermal treatment, the system was evacuated to a reached pressure of $5 \times 10^{-4}$ Pa or less, and then a CoCr magnetic layer was formed on the substrate. The target 6 had dimensions of 4 inch×6 inch×6 mm, the distance between the targets was 120 mm, the distance from the center between the targets to the rotatory drum surface was 120 mm, and the target had a composition of Co 80 wt. %–Cr 10 wt. %. Film forming conditions were argon pressure of 0.2 pa, thrown power of 2.5 kW, film forming speed of 1000 A/min., rotatory drum temperature of 190° C., tension of polymeric substrate of 1.2 kg, and the CoCr magnetic layer thickness was 0.4 μm. After a magnetic layer was thus formed on one surface, also on the opposite surface was formed a CoCr magnetic layer to a thickness of 0.4 μm under the same conditions. In FIG. 1 and FIG. 2, 1 is a delivery roller, 2 is a wind-up roller and 5 is a mask for restricting the flying magnetic particles.

Figure 4:
FIG. 4 is a front view showing the method for measuring curl of a substrate.

From the magnetic recording medium thus prepared, 15 discs of 47 mm in diameter were punched out and subjected to measurement of curling. The curling amount is shown in terms of average value of the heights of the both ends in the direction most curved when a disc is placed on a flat surface as shown in FIG. 4, namely $Kp = \frac{1}{2}(h_1 + h_2)$. The respective measurement results when the thermal treatment temperature are 100° C. and 190° C. are shown in Table 1.

EXAMPLE 2

The same polybiphenyl type imide as in Example 1 with a thickness of 25 μm and a width of 80 mm was subjected to the thermal treatment in air by means of the device shown in FIG. 1. The thermal treatment conditions were tension of 1.2 kg, rotatory drum temperature of 190° C., conveying speed of 6 cm/min. After the heat treatment, 15 magnetic discs were prepared in the same manner as in Example 1, and for each magnetic disc was measured curling amount. The results are shown in Table 1.

EXAMPLE 3

Two kinds of polybiphenyl type imide (the same as in Example 1) with thicknesses of 15 μm and 50 μm, and width of 80 mm for both were subjected to thermal treatments under the conditions of tension of 1.2 kg and conveying speed of 6 cm/min. in the case of the polybiphenyl type imide with a thickness of 15 μm, and under the conditions of tension of 2.0 kg and conveying speed of 3 cm/min. in the case of the polybiphenyl type imide with a thickness of 50 μm. The temperature of the rotatory drum and the reached pressure were in both polybiphenyl type imides 190° C. and $2 \times 10^{-3}$ Pa or less, respectively. After the heat treatment, 15 magnetic discs were prepared for each of the two kinds of polybiphenyl type imides, and for each disc, curling amount was measured. The measurement results are shown in Table 1.

COMPARATIVE EXAMPLE 1

The same polybiphenyl type imide as in Example 1 with a thickness of 25 μm and a width of 80 mm was used without thermal treatment to form a magnetic layer under the same conditions as in Example 1, thus preparing a magnetic recording medium. Further, 15 magnetic discs were prepared in the same manner as in Example 1, and curling amount was measured for each magnetic disc. The measurement results are shown in Table 1.

COMPARATIVE EXAMPLE 2

A magnetic recording medium was prepared in the same manner as in Example 1 except for changing the thermal treatment temperature to 70° C. Further, 15 magnetic discs were prepared in the same manner as in Example 1, and curling amount was measured for each magnetic disc. The measurement results are shown in Table 1.

TABLE 1

| | $K_p$ (mm) | | | | | |
|---|---|---|---|---|---|---|
| | Example | | | | Comparative example | |
| Disc No. | Example 1 | 2 | Example 3 | | 1 | 2 |
| No 1 | 0.7 | 0.7 | 0.8 | 0.4 | 0.3 | 4.9 | 1.5 |
| No 2 | 0.4 | 0.4 | 0.5 | 0.7 | 0.8 | 3.8 | 2.8 |
| No 3 | 0.8 | 0.3 | 0.3 | 0.4 | 0.6 | 3.3 | 1.6 |
| No 4 | 0.5 | 0.8 | 0.9 | 0.3 | 0.3 | 1.8 | 0.9 |
| No 5 | 0.9 | 0.5 | 0.6 | 0.8 | 0.4 | 0.5 | 1.9 |
| No 6 | 0.4 | 0.3 | 0.3 | 0.5 | 0.4 | 1.2 | 2.3 |
| No 7 | 0.6 | 0.9 | 0.4 | 0.3 | 0.3 | 3.0 | 1.2 |
| No 8 | 0.3 | 0.3 | 0.7 | 0.9 | 0.8 | 4.2 | 2.4 |
| No 9 | 0.7 | 0.3 | 0.4 | 0.6 | 0.5 | 2.5 | 2.7 |
| No 10 | 0.4 | 0.8 | 0.3 | 0.3 | 0.3 | 2.6 | 2.3 |
| No 11 | 0.3 | 0.5 | 0.8 | 0.4 | 0.9 | 1.1 | 1.4 |
| No 12 | 0.8 | 0.4 | 0.5 | 0.7 | 0.6 | 0.7 | 1.7 |
| No 13 | 0.3 | 0.6 | 0.4 | 0.4 | 0.3 | 1.4 | 2.3 |
| No 14 | 0.6 | 0.3 | 0.6 | 0.8 | 0.7 | 4.2 | 2.8 |
| No 15 | 0.4 | 0.7 | 0.3 | 0.1 | 0.4 | 2.0 | 2.2 |

TABLE 1-continued

| Disc No. | $K_p$ (mm) | | | | | | |
|---|---|---|---|---|---|---|---|
| | Example | | | | | Comparative example | |
| | Example 1 | 2 | | Example 3 | | 1 | 2 |
| Average Value of 15 discs | 0.5 | 0.5 | 0.5 | 0.5 | 0.5 | 2.5 | 2.0 |
| Film Thickness (μm) | 25 | 25 | 25 | 15 | 50 | 25 | 25 |
| Heat Treatment Temperature (°C.) | 100 in vacuum | 190 in vacuum | 190 in air | 190 in vacuum | 190 in vacuum | — | 70 in vacuum |

As described above, by using a polybiphenyl type imide for the substrate, and subjecting said substrate to heat treatment at a temperature of 100° C. or higher before formation of a magnetic layer on one or both surfaces, curl can be removed to produce flexible magnetic discs at good yield. Also, the thermal treatment step can be easily practiced sufficiently by means of a heating device of the prior art without requiring any special device.

What is claimed is:

1. A method for prparing a magnetic recording medium, which comprises applying a thermal treatment at a temperature of 100° C. or higher on a polymeric substrate comprising a polybiphenyl type imide having a molecular structure shown below, and then forming a magnetic layer on said substrate.

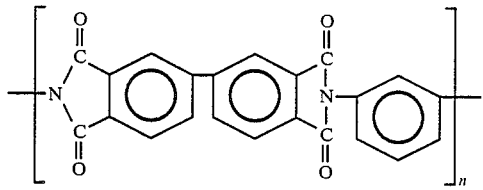

2. A method according to claim 1, wherein magnetic layers are formed on both surfaces of said substrate.

3. A method according to claim 2, wherein said magnetic layer is Co-Cr.

4. A magnetic recording medium prepared according to the method of claim 3.

5. A method according to claim 1, wherein said substrate has a thickness of 10 to 100 μm.

6. A magnetic recording medium prepared according to the method of claim 1.

* * * * *

UNITED STATES PATENT AND TRADEMARK OFFICE
CERTIFICATE OF CORRECTION

PATENT NO. : 4,917,959
DATED : April 17, 1990
INVENTOR(S) : YUJI KASANUKI

It is certified that error appears in the above-identified patent and that said Letters Patent is hereby corrected as shown below:

COLUMN 2

Line 7, "treatment" should read --treatment of--.

COLUMN 4

Line 2, "IR ray" should read --IR-ray--.
    Line 3, "oui" should read --out--.
    Line 42, "Co Ni," should read --Co-Ni,--.
    Line 44, "Fe N," should read --Fe-N,--.
    Line 49, "non magnetic" should read --non-magnetic film--.
    Line 64, "means" should read --means of--.

COLUMN 5

Line 29, "0.2 pa," should read --0.2 Pa,--.

COLUMN 7

Line 31, "prparing" should read --preparing--.

Signed and Sealed this

Twenty-fifth Day of February, 1992

Attest:

HARRY F. MANBECK, JR.

*Attesting Officer*      *Commissioner of Patents and Trademarks*